UNITED STATES PATENT OFFICE.

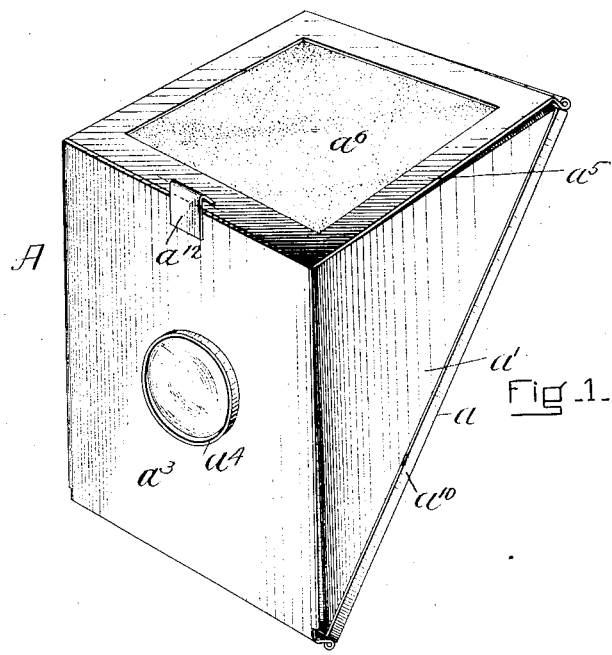
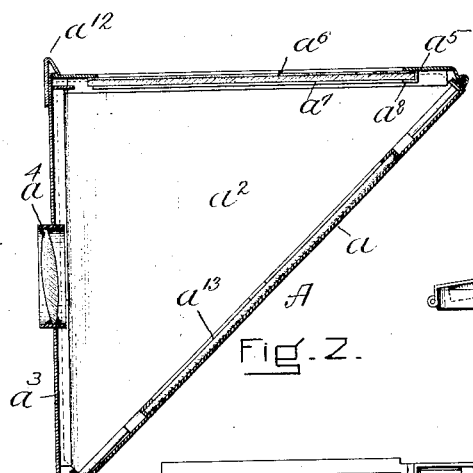
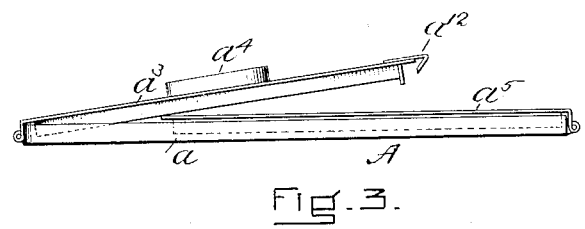
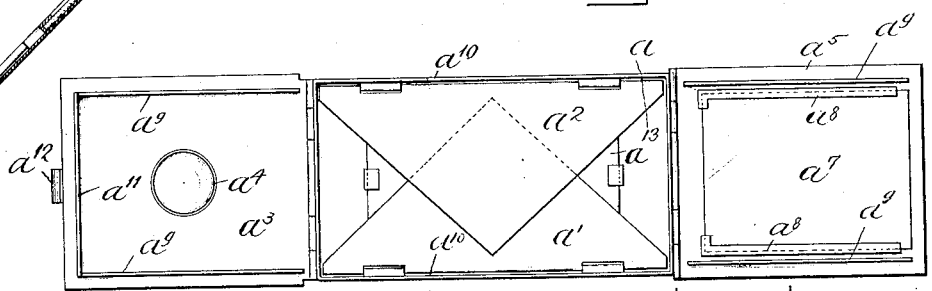

WILLIAM JAY LITTLE, OF NEWTON, MASSACHUSETTS.

CAMERA.

No. 844,152.     Specification of Letters Patent.     Patented Feb. 12, 1907.

Application filed February 21, 1906. Serial No. 302,175.

*To all whom it may concern:*

Be it known that I, WILLIAM JAY LITTLE, of Newton, in the county of Middlesex and State of Massachusetts, a citizen of the United States, have invented a new and useful Improvement in Cameras, of which the following is a full, clear, and exact description, reference being had to the accompanying drawings, forming a part of this specification, in explaining its nature.

My invention relates to a camera or that kind of a device in which the image of an exterior object is projected on a plane surface.

The especial object of my invention is to provide a camera in which there may be used a plate coated with some etching surface or ground like that referred to in my United States Patent No. 780,207, dated January 17, 1905, the plate being so arranged as to form one side or portion of the camera and on the under side of which plate the image of an exterior object may be projected, whereby it may be traced upon the plate by cuts or incisions made in the etching ground or surface thereof.

My invention can best be seen and understood by reference to the drawings, in which—

Figure 1 shows the camera in perspective. Fig. 2 shows a vertical cross-section thereof, taken at about the middle of the camera. Fig. 3 shows in side elevation the camera folded. Fig. 4 shows the camera in plan, open, with sides folded in.

In the drawings, A represents the camera, preferably having the form of a triangular box, as shown in Fig. 1. It is also preferably made of a folding or knockdown structure in order that when folded it may occupy as little space as possible or assume a form substantially as shown in Fig. 3, when it can be easily carried in one's pocket. The camera accordingly is made up or comprises the following parts: The bottom or base-plate $a$, to the side edges of which are hinged the triangularly-shaped sides $a'$ $a^2$; the face-plate $a^3$, hinged to one end of the bottom or base plate and in which is mounted a bull's-eye or lens $a^4$, and the plate, or rather frame, $a^5$, which holds a plate $a^6$, coated on the outside with some etching surface or ground and which is translucent in order that an image projected upon the under side of said plate may be seen by looking through the same, as will hereinafter be explained. It may also be noted that this etching-plate may consist only of a flexible film having an etching surface or ground, in which case there is provided a backing for said film or plate consisting of an auxiliary glass plate $a^7$, inserted in the frame back of the film. The etching plate or film, together with its backing, is slipped into the frame from the top and is held in the frame by any suitable supporting-flanges $a^8$.

The face-plate $a^3$ and plate-carrying frame $a^5$ are adapted to fold down over the side plates $a'$ $a^2$ and meet at the apex thereof when the side plates are turned up to assume a vertical position with respect to the bottom plate $a$, all of which parts thus combined form a closed triangular box. The parts are held together thus in combination in the following manner: There are formed on the inside of the face-plate $a^3$ and frame $a^5$, just in from the edges thereof, flanges $a^9$, against which the side plates $a'$ $a^2$ are adapted to bear when they are turned up to assume an upright position, as aforesaid, forming the box. It is also to be noted that these side plates are kept from being turned outwardly beyond a vertical upright position by flanges $a^{10}$, turned up along the side edges of the base or bottom plate $a$. There is also a flange $a^{11}$ along the inner side of the face-plate $a^3$, near the top edge thereof, against which the top edge of the frame is adapted to bear when the parts are in conjunction. The parts are held in conjunction by means of a clamp $a^{12}$, carried by the face-plate $a^3$, and which engages with the top edge of the frame $a^5$.

Within the camera resting on the bottom or base plate $a$ there is arranged a mirror or reflecting-surface $a^{13}$, which has such disposition with respect to the bull's-eye and etching plate or film before referred to, or, in other words, the bull's eye and etching plate or film are so relatively disposed to the mirror that the image of an exterior object passing through the bull's-eye or lens will fall upon the mirror or reflecting-surface and reflected thereby will be projected to appear in an upright position upon the under side of the etching plate or film. The image may then be traced by cuts or incisions made in the etching surface or ground and afterward a print made from the etching plate or film substantially as described in my United States Patent No. 780,207, dated January 17, 1905.

While the camera is especially adapted to receive a plate like that above referred to, it is also adapted, of course, to receive any kind of plate or material presenting an etching or sketching surface.

Having thus fully described my invention, I claim and desire to secure by Letters Patent of the United States—

1. A camera of the character specified comprising a closed, knockdown box of triangular form, the same having a bottom or base plate, triangularly-shaped sides, a face-plate hinged to one end of said bottom or base plate, and a frame hinged to the other end thereof, which frame is adapted to receive a plate or film, and which face-plate and frame fold over said triangular sides and meet at the apex thereof, means for retaining said sides, face-plate and frame thus in conjunction, a bull's-eye disposed in said face-plate, and a reflecting-surface inside the camera on the bottom or base plate, and which parts are so disposed that the image of an exterior object passing through said bull's-eye will fall upon said reflecting-surface, be reflected thereby and projected upon the under surface of said plate or film.

2. A camera of the character specified comprising a closed, knockdown box of triangular form, the same having a bottom or base plate, triangularly-shaped side plates hinged thereto, a face-plate hinged to one end of said bottom or base plate, and a frame hinged to the other end thereof, which face-plate and frame are adapted to fold over said triangular sides and meet at the apex thereof, means for retaining said sides, face-plate and frame thus in conjunction, a bull's-eye disposed in said face-plate, a reflecting-surface inside the camera on the bottom or base plate and a plate or film having a translucent etching surface or ground arranged inside said frame, which parts are so disposed that the image of an exterior object passing through said bull's-eye will fall upon said reflecting-surface, be reflected thereby and projected upon the under side of said etching plate or film.

WILLIAM JAY LITTLE.

In presence of—
M. E. FLAHERTY,
JOHN E. R. HAYES.